United States Patent

[11] 3,537,569

| [72] | Inventor | John M. Leach<br>P.O. Box 341, Port Jefferson, New York 11777 |
|---|---|---|
| [21] | Appl. No. | 765,250 |
| [22] | Filed | Oct. 4, 1968<br>Continuation-in-part of Ser. No. 726,381,<br>May 3, 1968, Patent No. 3,451,527 |
| [45] | Patented | Nov. 3, 1970 |

[54] ARTICLE HANDLING CONVEYORS
10 Claims, 1 Drawing Fig.

| [52] | U.S. Cl. | 198/127 |
|---|---|---|
| [51] | Int. Cl. | B65g 13/02 |
| [50] | Field of Search | 198/127, 160, 203, 110 |

[56] References Cited
UNITED STATES PATENTS

| 3,116,823 | 1/1964 | Schneider | 198/127 |
|---|---|---|---|
| 3,400,806 | 9/1968 | Leach | 198/127 |

*Primary Examiner*—Richard E. Aegerter

ABSTRACT: This invention relates to power-driven article conveyors of the type commonly known as accumulation conveyors. In the operation of such type conveyor, whenever an article is stopped thereon for any reason, suitable mechanism is operated to stop the forward movement of the next article behind the stopped article in the direction of article flow just before or just as it touches the stopped article, and this action is continued along down the line of approaching articles so as to prevent the articles from forcibly crowding together sufficiently to damage each other or make them difficult to remove from the line. The accumulation conveyor of the present invention is capable of performing its accumulation in both directions of article flow, or is reversible.

Patented Nov. 3, 1970
3,537,569
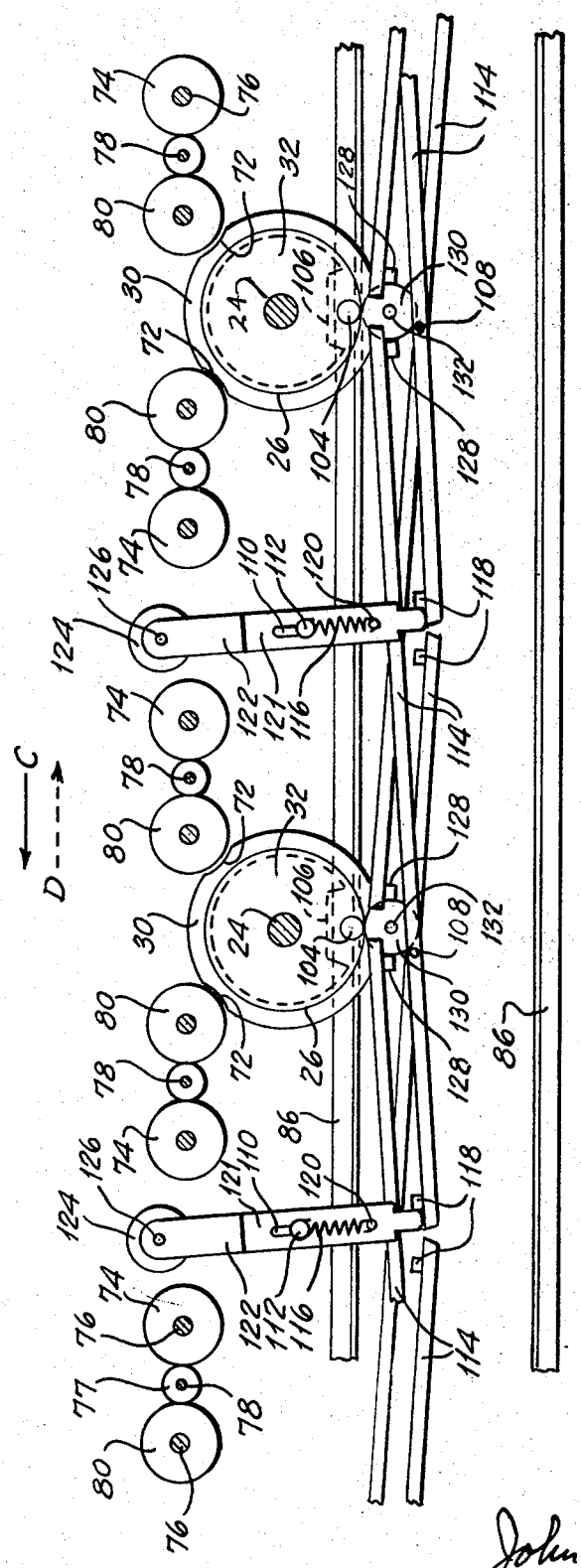
INVENTOR.
John M. Leach

ARTICLE HANDLING CONVEYORS

This application is in part a continuation of application Ser. No. 726,381, filed May 3, 1968, now U.S. Pat. No. 3,451,527, covering Article Handling Conveyors. All of the objects set forth in that application apply with equal force to this invention.

It is also an object of the present invention to provide an accumulation-type article handling conveyer which can be operated in opposite directions to accumulate articles just by reversing the direction of the drive.

It is another object of the present invention to provide an article handling accumulation conveyor which responds very rapidly to its stop and start controls during accumulation operations.

It is a further object of the present invention to provide an article handling accumulation conveyor which is of very simple construction and is also very efficient in operation.

Other objects and advantages of the present invention will become apparent to those skilled in the art upon recourse to the following specification and drawing which is a skeletonized side elevational view of a reversible, accumulation conveyor made in accordance with the present invention and in which all frame structure and driving mechanisms have been eliminated in order to more clearly show the details of the inventive phases of the conveyor.

The present invention is shown in this application as being applied to a roller-type conveyor but it is to be understood the invention can with equal facility be applied to other types of conveyors such, for example, as skate wheel units.

Rollers 74 and 80 are suitably mounted for rotation on shafts 76 which are suitably supported on the frame (not shown). Each pair of rollers 74—80 are interdriven by friction wheels 77 mounted for rotation on shafts 78 also suitably supported by the frame. Rollers 74 and 80 when driven comprise rotatable article supporting and moving elements. More than two such rollers can be interdriven and the rollers 74 may be merely idler rollers where desired.

Adjacent rollers 80 are interdriven by a wheel 26 preferably provided with a friction surface 30 and mounted for rotation with a shaft 24 which is suitably mounted for rotation on the frame. A V-pulley 32 is also mounted for rotation with the shaft 24 or, if preferred, can be attached to one side of the wheel 26 and both may be allowed to rotate on the shaft 24. The V-pulley 32 has a cross section of the V-area completely cut out as shown at 106, and a stud 104 is suitably attached to the wheel 26 at a point preferably exactly centered on the cut area 106 of the V-pulley.

A V-belt 86 is suitably supported at one end by a driven pulley and at the opposite and by a takeup pulley (neither shown) which are suitably mounted on the frame. The V-belt 86 is positioned with the V-area on the outside so that its upper run normally lies in the V-grooves of the V-pulleys 32. A pressure wheel 130 is suitably mounted at each V-pulley 132 on the opposite side of the V-belt 86 so as to maintain the V-belt 86 normally tightly engaged in each V-pulley groove. It will thus be seen that the movement of the V-belt 86 will rotate each V-pulley 32 which will in turn through frictional contact with each wheel 26 rotate each pair of rollers 80 which will through friction wheel 77 rotate the rollers 74 and articles carried on the supporting and moving elements thus provided will be moved along the conveyor. The belt will normally pass through the cutout sections 106 of the V-pulleys 32 too quickly to cause any noticeable hesitation of the V-pulleys.

It will be noted that V-belt 86 and each wheel 26—V-pulley 32 assembly and the rollers 74—80 driven thereby provides a power-driven operative section of which there are a multiplicity disposed along the frame to move articles along the frame from one section to the next.

Between successive power-driven operative sections a suitable space is provided in which article sensors are positioned. Each sensor comprises an arm 121 suitably mounted for slight rotation and also vertical movement as by being provided with a slot 110 through which a headed stud 112 extends and is in turn suitably mounted on the frame. A tension-type coil spring is connected at its upper end to the stud 112 and at its lower end to a projection 120 on the arm 121 which causes the arm 120 to rest in its uppermost position with the stud 112 at the bottom of the slot 110 but capable of being lowered by the application of light pressure downwardly on the arm 121. One or more wheels 124 are rotatably mounted in a bifurcated section 122 attached to the top of the arm 121. A roller can if desired be used in place of one or more wheels 124.

Arms or levers 114 are pivoted in pairs on suitable studs 108 which are suitably carried by the frame. Each arm 114 extends from a point near the lower end of an arm 121 to a point adjacent to and just below a stud 104 where it rests on a suitable ledge 128 carried by the frame as shown in the drawing. The arrangement as shown is such that two arms, each extending in opposite directions, terminate near the bottom of an arm 121 and two arms, each extending in opposite directions, terminate near a stud 104. Each arm 121 is maintained in one or the other of its two possible extreme positions where its lower end rests just over the terminus of one or the other of the ends of the levers 114 just below it by a stop 118 carried by each lever 114.

Each of the wheel friction treads 30 is provided with two shallow cutout areas 72 positioned so as to each be adjacent a roller 80 when the stud 104 is accurately at the bottom of its travel as shown. This causes the adjacent rollers 80 to be released by the friction wheel tread 30 when in the position shown.

In the operation of the accumulation conveyor of the present invention, the power drive is energized suitably as by pushing an "ON" button and articles are placed or fed onto the conveyor. When the conveyor is running so as to move the articles in the direction shown by the solid arrow C, the wheels or rollers 124 will each be contacted one after the other by the first article along the conveyor and all of the sensor arms 121 will be rotated counterclockwise as shown if they are not already in that position. In this extreme position, the lower end of each arm 121 will be directly over the terminus of the arm 114 below it and to the right as shown. As each article passes on over each wheel 124 the weight of the article will depress the sensor against the light force of the spring 116 so as to depress the end of the arm 114 beneath it which will elevate the opposite end of the same arm so as to move the end up into the path of movement of the adjacent stud 104 and stop the rotation of the wheel 26—V-pulley 32 assembly associated with that stud. If the articles are moving, however, this will be only a brief stoppage which will come to an end when the package or article moves off the wheel 124 and will probably not even cause the article over the stopped assembly 26—32 to stop because the cutout areas of the friction wheel tread 30 will permit the adjacent rollers 80 and 74 to coast for a short time.

As soon, however, as an article is stopped in progress along the conveyor, for example, when it arrives at the end of the conveyor where a stop bar is usually positioned and where a sensor is usually provided, it will rest on the sensor and move the arm 114 beneath and to the right of the sensor arm 121 bottom end and cause stoppage of the operative section controlled by that particular arm 114 as above described. It will be noted that it will always be the next operative section behind the stopped article relative to the direction of article flow which will be so stopped. This means that the next article behind the stopped article will also be stopped as soon as it moves onto the operative section which has just been so stopped and it will depress the next sensor behind the first depressed sensor to deactivate the operative section behind it and so on down the line as successive articles are stopped as far as the accumulation conveyor extends.

When the first stopped article in the direction of article flow is removed, it will relieve the pressure on the sensor it was depressing which will cause the arm 114 which had been depressed by the sensor to rise at the end under that sensor and lower at its opposite end so as to release the stud 104 which it had been holding in stopped position and allow the assembly 26—32 to rotate and rotate the rollers 80—74 under the next package to rotate and move the next package ahead and as soon as it moves off the sensor it had been resting on this startup operation will be repeated all down the line of articles on the accumulation conveyor.

It will be noted that when each V-shaped 32 is in position where it is stopped when its stud 104 is stopped by an arm 114, the cutout section 106 will be in position where it encompasses where the V-belt 86 which passes through it without exerting any substantial driving force against the V-pulley, but will always have a very slight rubbing action against the V-sides of the pulley right at the ends of the cutout area 106 which will rotate the V-pulley the very slight amount required before the V-sides of the belt grab the V-sides of the groove in the V-pulley and starts positively driving the assembly 26—32. This is one of the important advantages of having the sides of the V-pulley groove actually cut out instead of bent out. When the sides are bent out there is a relatively long transition space from the point where the groove sides start to leave the belt sides and where the release is complete. Where the area is cut out the release distance is substantially zero. Also, the effective length of the cutout areas 72 in the treads 30 of the wheels 26 is made sufficiently long so that each wheel 26 can turn the very slight amount required before the belt starts to positively drive the V-pulley before the wheel 26 starts to drive the rollers 80. This means that the assembly 26—32 is being turned under no load at the start and for the distance required before the V-belt positively drives the V-pulley. This means that only the very slightest contact between the V-belt and the edge of the cutout section 106 is required to make a very prompt startup of a stopped article.

When it is desired to reverse the travel direction of the conveyor, it will only be necessary to push a suitable "Stop" button and "Reverse" button and the belt 86 will be driven in the opposite direction which will through the assemblies 26—32 drive the rollers 74—80 in the opposite direction so as to move articles in the direction shown by the dotted arrow D. This means that the first article along the conveyor will contact and move each sensor arm 141 clockwise so that its bottom end will be directly over the other of the pair of arm 114 terminals disposed under each arm 121. From then on the operation of the accumulation conveyor will be the same as for the other direction except that a different set of arms 114 will be used and each sensor will control a different operative section than before, namely, the operative section corresponding to that formerly controlled but in the opposite direction relatively to its sensor.

It will be noted that each stud 104 and its adjacent cutout section 106 in a V-pulley comprise a deactivating means for that power-driven operative section which it is associated with. Also, each arm 114 provides a connecting means between its associated sensor and stud 104 and, being simple and economical, is the preferred connecting means but more complicated connecting means, such as a bodin wire, air or hydraulic-operated-type of linkage may also be used where desired.

The spacing of the sensors will usually be selected so that an article of the size predominantly conveyed will just be short of spanning two sensors but this will not preclude the use of both longer and shorter articles on the unit.

When a sensor is first contacted and moved by an article it is an initial movement which places the sensor from one of its extreme positions to the other. This is followed by a subsequent movement of the sensor when the article travels farther and depresses the sensor to operate the power-driven section deactivating means.

The foregoing is to be considered as descriptive and not limitative because many changes and modifications can be made in the physical structure of the form of the invention described without departing from the scope of the present invention.

I claim:

1. A reversible direction article accumulation conveyor comprising a frame, reversible direction power-driven means disposed in operative sections along said frame for moving articles there along selectively in one of two opposite directions, multiple means, each of which multiple means is for deactivating one of said operative sections to prevent movement of articles by the section under its control, article operable sensors spaced along said frame and each being capable of initial and subsequent movements, the initial movement being into one of two opposite extreme positions and caused by initial contact with the sensor by any moving article and always in the direction of movement of the said article, connecting means between each of said sensors when in one of its extreme positions and one or more of said operative section deactivating means located in a direction relative to the associated sensor which is opposite to the direction of movement of the article which placed said sensor in that extreme position, and the subsequent movement of said last-named sensor being caused by farther movement of said any article and to actuate said connecting means to operate said deactivating means for said last-named section or sections.

2. A reversible article accumulation conveyor as specified in claim 1 further characterized in that the power-driven means includes a powered V-belt extending along the sections thereof and each section includes a V-pulley driven by said V-belt.

3. An article accumulation conveyor as specified in claim 2 further characterized in that said V-belt is a single type but turned inside out from the normal V-belt application so that the V-section of said belt projects outwardly from the area encompassed by the said belt.

4. An article accumulation conveyor as specified in claim 2 in which the periphery of each V-pulley includes a cutout section in which the V-belt does not drive the pulley while passing through said cutout section.

5. An article accumulation conveyor as specified in claim 3 in which the periphery of each V-pulley includes a cutout section in which the V-belt does not drive the pulley while passing through said cutout section.

6. A reversible accumulation conveyor as specified in claim 1 in thereof. which the power-driven means includes a powered belt extending along the sections thereof.

7. A reversible article accumulation conveyor as specified in claim 6 in which the power-driven means further includes rotatable elements driven by said belt.

8. A reversible article accumulation conveyor as specified in claim 1 in which the power-driven means includes a powered belt extending along the sections thereof and rotatable elements driven by said belt, and the operative section deactivating means functions by interrupting driving relations between said belt and said rotatable elements.

9. An article accumulation conveyor comprising a frame, rotatable article supporting and moving elements mounted on said frame, a power-driven V-belt extending along said frame adjacent to but not in contact with said elements, means including a V-pulley driven by said V-belt for driving at least one of said elements, said V-pulley having a cutout section in the peripheries of the sides forming its V-groove to provide both a quickly active and inactive V-belt slippage area which is effective whenever the sides' cutout section encompasses said V-belt.

10. An article accumulation conveyor as specified in claim 9 in which the sides forming the V-area of said pulley at the ends of the sides cutout section lightly contact said V-belt when said slippage area is effective.